United States Patent
Salonaho et al.

(10) Patent No.: US 7,496,373 B2
(45) Date of Patent: Feb. 24, 2009

(54) METHOD FOR CONTROLLING TRANSMISSION POWER

(75) Inventors: Oscar Salonaho, Helsinki (FI); Jochen Grandell, Espoo (FI)

(73) Assignee: Nokia Corporation, Espoo (FI)

( * ) Notice: Subject to any disclaimer, the term of this patent is extended or adjusted under 35 U.S.C. 154(b) by 860 days.

(21) Appl. No.: 09/977,269

(22) Filed: Oct. 12, 2001

(65) Prior Publication Data

US 2002/0082037 A1    Jun. 27, 2002

Related U.S. Application Data

(63) Continuation of application No. PCT/IB00/00572, filed on Apr. 14, 2000.

(30) Foreign Application Priority Data

Apr. 14, 1999    (GB) .............................. 9908518.5

(51) Int. Cl.
*H04B 7/00* (2006.01)
*H04B 1/00* (2006.01)

(52) U.S. Cl. .................... 455/522; 455/68; 455/69

(58) Field of Classification Search ............ 455/13.4, 455/522, 574, 127.1, 3.3, 56.1, 361, 560, 455/524, 456.5, 418, 419, 420, 67.13, 68, 455/69, 525, 439, 442, 436, 438, 437, 423, 455/67.11, 517, 115.1, 572; 370/318, 317, 370/252, 331, 332, 342

See application file for complete search history.

(56) References Cited

U.S. PATENT DOCUMENTS

| | | | |
|---|---|---|---|
| 5,461,639 A | | 10/1995 | Wheatley, III et al. |
| 5,943,610 A | * | 8/1999 | Endo .......................... 455/69 |
| 6,539,226 B1 | * | 3/2003 | Furukawa et al. ........... 455/442 |
| 6,678,531 B1 | * | 1/2004 | Salonaho .................... 455/522 |
| 6,690,944 B1 | * | 2/2004 | Lee et al. .................... 455/522 |
| 6,708,041 B1 | * | 3/2004 | Butovitsch et al. .......... 455/522 |
| 6,975,880 B2 | * | 12/2005 | Lundby et al. .............. 455/522 |
| 2002/0122460 A1 | * | 9/2002 | Lomp ........................ 375/130 |

FOREIGN PATENT DOCUMENTS

| | | |
|---|---|---|
| EP | 0683570 A2 | 11/1995 |
| EP | 0797318 A2 | 9/1997 |

(Continued)

OTHER PUBLICATIONS

English translation of Japanese Office Action mailed on Feb. 13, 2006.

(Continued)

*Primary Examiner*—Melody Mehrpour
(74) *Attorney, Agent, or Firm*—Squire, Sanders & Dempsey, LLP

(57) ABSTRACT

A method of controlling the power with which a first station transmits signals to a second station, comprising the steps of transmitting from the second station to the first station a power control command having a given value; receiving said power control command at said first station; determining from said received power control command a parameter representative of the quality with which the power control command is received at the first station; and controlling the power which the first station transmits signals based on the determination step.

32 Claims, 4 Drawing Sheets

FOREIGN PATENT DOCUMENTS

| | | |
|---|---|---|
| EP | 0848505 A1 | 6/1998 |
| JP | 09-312609 | 2/1997 |
| JP | 10-126337 | 5/1998 |
| WO | WO 97/26716 | 7/1997 |
| WO | WO 98/47246 | 10/1998 |
| WO | WO 98/49785 | 11/1998 |
| WO | WO 99/37111 | 7/1999 |

OTHER PUBLICATIONS

English translation of Japanese Office Action mailed on Oct. 10, 2006.

International Search Report for PCT/IB00/00572.

* cited by examiner

METHOD FOR CONTROLLING TRANSMISSION POWER

This application is a continuation of international application serial number PCT/IB00/00572, filed 14 Apr. 2000.

FIELD OF THE INVENTION

The present invention relates to a method of controlling transmission power of a first station, in particular, but not exclusively a mobile station. The present invention also relates to a station for example a mobile station.

BACKGROUND OF THE INVENTION

The use of code division multiple access (CDMA) is being proposed for the next generation of cellular telecommunication networks. Additionally, code division multiple access is also being used in the IS-95 Standard in the USA. CDMA is a direct sequence spread spectrum technique. In a wireless cellular network using CDMA, the mobile terminals in one cell associated with a first base station will use the same frequency as mobile stations in an adjacent cell associated with a second base station. The different mobile stations can be distinguished by the respective base stations as each mobile station will be using a different spreading code.

In U.S. Pat. No. 5,101,501 a CDMA system is described which uses "soft" handoff. With soft handoff, a mobile station is capable of communicating with more than one base station at the same time. This will typically occur when the mobile station is close to the boundary defined between two cells. The signals sent by the mobile stations will be received and processed by both of the base stations. Likewise, the mobile station will receive the same signal from the two base stations. The signals from the two base stations may be combined.

U.S. Pat. No. 5,265,119 discloses a method of controlling the power of a mobile station which is in communication with two or more base stations at the same time. Each base station which is in communication with the mobile station sends power control commands to the mobile station. These power control commands will instruct the mobile station to increase or reduce the power with which it transmits signals to the base station. If a mobile station is in communication with more than one base station at the same time, the mobile station may receive conflicting power control commands from different base stations. Accordingly, the mobile station will only increase its transmission power if all the base stations which are in communication with the mobile station instruct the mobile station to increase its transmission power. The mobile station will decrease its transmission power if any one or more of the base stations which are in communication with the mobile station instruct the mobile station to reduce its transmission power.

However this approach has some problems. In particular, in order to be able to use this technique, the transmitter power control commands must be sent to the mobile station from the base station without any unnecessary delays. This is because the power control commands provided by the base station are determined based on the strength of signals received from the mobile station at the base station. In an environment which is changing quickly, the power control commands front the base station must be received by the mobile station before the environment has changed significantly if the power control commands are to be effective. In other words for effective power control the environment should change little during the time taken for a signal transmitted by the mobile station to be received by the base station, the power control command to be generated by the base station from the strength of the received signal and for the power control command to be transmitted to and received by the mobile station.

To avoid unnecessary delays, the power control commands are not error protected or only relatively weakly error protected. This means that there is a significant probability that there is an error in the power control command received at the mobile station. An error in the power control command may result in the mobile station increasing or decreasing its transmission power in error. Over time, the errors caused by the power control command being incorrectly received by the mobile station will result in the energy per bit to noise (Eb/No) ratio unnecessarily varying. In an interference sensitive system such as CDMA, this may adversely affect the quality of communications and/or the capacity of the system.

It has been proposed that the reliability of the power control commands be estimated and that the mobile station only respond to reliable commands. The method which has been proposed to estimate the reliability of the power control commands uses signal to interference ratio (SIR) information. In particular the signal to interference ratio of other signals received by the mobile station from the base station in question is determined. If the ratio exceeds a given threshold, then the power control command from the base station in question is determined to be reliable. If the ratio falls below the threshold, then the power control command from the base station in question is determined to be unreliable and is ignored by the mobile station.

This method has the problem that this method relies on the set threshold for the signal to noise ratio to determine if the power control command is or is not reliable. This may result in accurately received power control commands being ignored.

SUMMARY OF THE INVENTION

It is an aim of embodiments of the present invention to provide a improved method for determining the reliability of power control commands received at, for example, mobile stations.

According to one aspect of the present invention, there is provided a method of controlling the power with which a first station transmits signals to a second station, comprising the steps of: transmitting from the second station to the first station a power control command having a given value; receiving said power control command at said first station; determining from said received power control command a parameter representative of the quality with which the power control command is received at the first station; and controlling the power which the first station transmits signals based on the determination step.

Thus the quality with which the power control command itself is received is used unlike in the proposals discussed hereinbefore.

Preferably, in said determining step, the received value of said received power control command is determined as said parameter. It should be appreciated that the received power control value may differ from that which is transmitted due to the effects of the channel between the first and second stations. The received value may be the value after the decoding of the signal from the carrier wave but before the detection of individual power control bits transmitted to the first station by the second station.

Preferably, the method further comprising the steps of comparing said determined received value with a threshold value; determining the given value which was transmitted based on said comparing step; and in said controlling step controlling the power which the first station transmits signals based on the determined transmitted value. Thus the transmitted value is determined on the basis of the received value.

According to a second aspect of the present invention, there is provided a method of controlling the power with which a first station transmits signals to a plurality of second stations, comprising the steps of; transmitting from each of the second stations to the first station a power control command having a given value; receiving said power control commands at said first station; determining the received values of said received power control commands; combining the received values of said received power control commands; and controlling the power with which first station transmits to the second station based on said combined value.

It should be appreciated that in the third aspect of the present invention the actual received signal values can be used or the values which were determined to have been transmitted.

According to a third aspect of the present invention, there is provided a method of controlling the power with which a first station transmits signals to a second station, comprising the steps of; transmitting from the second station to the first station a plurality of power control commands; receiving said power control commands at said first station; determining the value of said received power control values; controlling the power with which the first station transmits to the second station based on a currently received power control command and least one previously received power control command.

According to a fourth aspect of the present invention there is provided a first station which in use transmits signals to a second station, said first station comprising: means for receiving a power control command transmitted from said second station to said first station, said power control command being transmitted with a given value; determining means for determining from said received power control command a parameter representative of the quality with which the power control command is received at the first station; and control means for a controlling the power which the first station transmits signals based on the determination carried out by said determining means.

According to a further aspect of the present invention there is provided a first station which in use transmits signals to a plurality of second stations, said first station comprising: means for receiving power control commands transmitted from said second stations to said first station, said power control commands being transmitted with given values; means for determining the received values of said received power control commands; means for combining the received values of said received power control commands; and means for controlling the power with which first station transmits to the second station based on said combined value.

According to a further aspect at the present invention, there is provided a first station which in use transmits signals to a second station, said first station comprising: means for receiving power control commands transmitted from said second station to said first station; means for determining the values or said received power control values; and means for controlling the power with which the first station transmits to the second station based on a currently received power control command and at least one previously received power control command.

According to a further aspect of the present invention, there is provided a method for controlling the power which a first station transmits signals to a second station comprising the steps of: transmitting from the second station to the first station a power control command; receiving said power control command at the first station; determining, using a plurality of different methods, power control information from said received power control command; and controlling the power with which the first station transmits to the second station based on the determination step.

BRIEF DESCRIPTION OF DRAWINGS

For a better understanding of the present invention and as to how the same may be carried into effect, reference will now be made by way of example to the accompanying drawings in which.

DETAILED DESCRIPTION OF PREFERRED EMBODIMENTS

Figure 1:
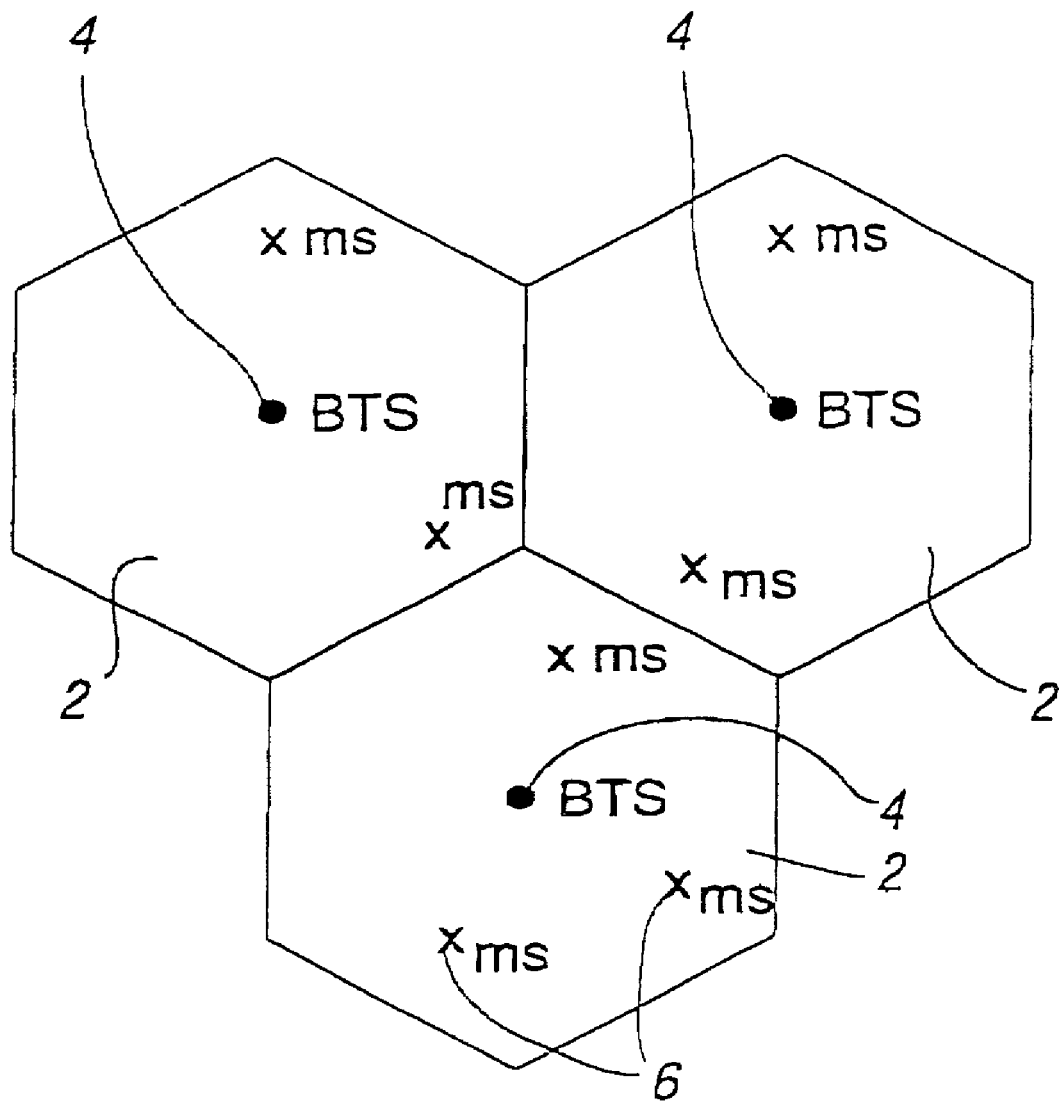
FIG. 1 shows a schematic diagram of part or a cellular telecommunications network incorporating base transceiver stations and mobile stations.

Reference will first be made to FIG. 1 in which three cells 2 of a cellular telecommunications network are shown. Each cell 2 is served by a respective base transceiver station (BTS) 4. Each base transceiver station 4 is arranged to transmit signals to and receive signals from the mobile stations 6 located in the cell associated with the given base transceiver station 4. Likewise, each mobile station 6 is able to transmit signals to and receive signals from the respective base transceiver station 4.

The cellular telecommunications network shown in FIG. 1 uses a code division multiple access technique. Accordingly, at least some of the mobile stations will be in communication with more than one base station at the same time. This, however, will be described in more detail hereinafter.

The power control method which is used when more than one base station is in communication with more than one mobile station will now be described.

The accuracy of the power control command is based on the quality of power control command received at the mobile station. This is instead of the signal to noise ratio approach which has previously been proposed. The power control command which is transmitted by the base station can have one of two values. If the value of the command is "1", then the base station is instructing the mobile station to increase its transmission power. If the value of the command is "−1", then the base station is instructing the mobile station to decrease its transmission power. In other embodiments of the present invention, the respective values may be "1" and "0" or any other suitable values.

However, due to the effects of interference or the like, the received symbols which are received at the mobile station will have been distorted and can in principle fall in the range of values from $-\infty$ to $+\infty$. Typical values may fall inside the range −1 to +1 or outside this range. Examples of typical values are +5, 0.8, or −0.4.

The power control command transmitted by the base station is determined by base station from the strength of signals received from the mobile station. Based on the strength of the received signals, the base station determines if the mobile station should increase or decrease its transmission power. The power control command values can alternatively be determined in any suitable manner.

Figure 2:
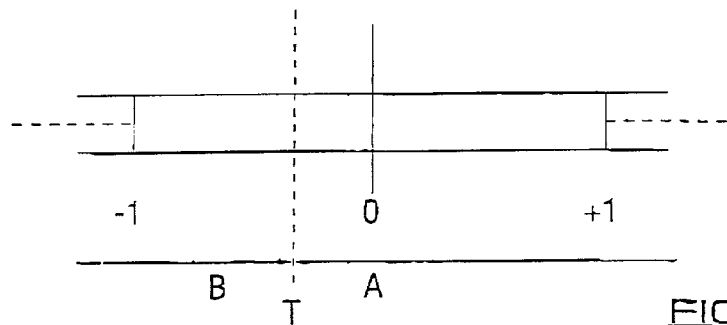
FIG. 2 shows the threshold used in a first embodiment.

Reference is made to FIG. 2 which shows how a decision is made as the which of the two commands the mobile station has received. A threshold value T is defined. If the value detected at the mobile station is above the threshold T, then the value is determined to be +1. If the value detected by the mobile station is below the threshold T, the value is determined to be −1. As can be seen from FIG. 2, the threshold T may not be centrally located at 0 between the extreme values at each end of the range. In preferred embodiments, the threshold is between the values of −0.6 to 0. More preferably, the threshold is between the values of −0.25 to −0.03. These values are appropriate in situations where the noise has normalised. It should be appreciated that the normalisation can be carried out in any appropriate way. The values given by way of example for the threshold will be dependent on the nature of the system including the method of normalisation and therefore can be different to those suggested hereinbefore.

This decision can be summarised as follows;

If the value of the power control command received at the mobile station is greater than or equal to the threshold value (marked A in FIG. 2) then the power control command is +1. In other cases (marked B in FIG. 2) the power control command is −1.

If a mobile station is in communication with two or more base stations, the mobile station will receive a power control value from each base station. The power control value from each base station is determined as described hereinbefore. The power command signal from each of the base stations are compared and the minimum power control command value is selected. In other words, if at least one base station instructs the mobile station to decrease its power, then the mobile station will decrease its power.

The threshold can be set so that the decrease power command is generally more accurate than the increase power command. This is because if a mobile station is interprets incorrectly the power control command and reduces the power instead of increasing it, then the connection between the mobile station and the base station could be lost or adversely affected. This could be a problem particularly if successive increase power control commands are misinterpreted as decrease power control commands. Additionally since one decrease power control instruction from one of a plurality of base stations is enough to cause the mobile station to decrease power, it is more likely that the power will be decreased in practice than increased, thus effectively compensating for the threshold being closer to the decrease power value than the increase power value. In alternative embodiments of the present invention, the threshold can be set so that the increase power control command is more accurate than the decrease power command.

This method of determining the power control value may be used by mobile stations which are only in communication with a single base station as well as by mobile stations in communication with a plurality of base stations.

Figure 3:
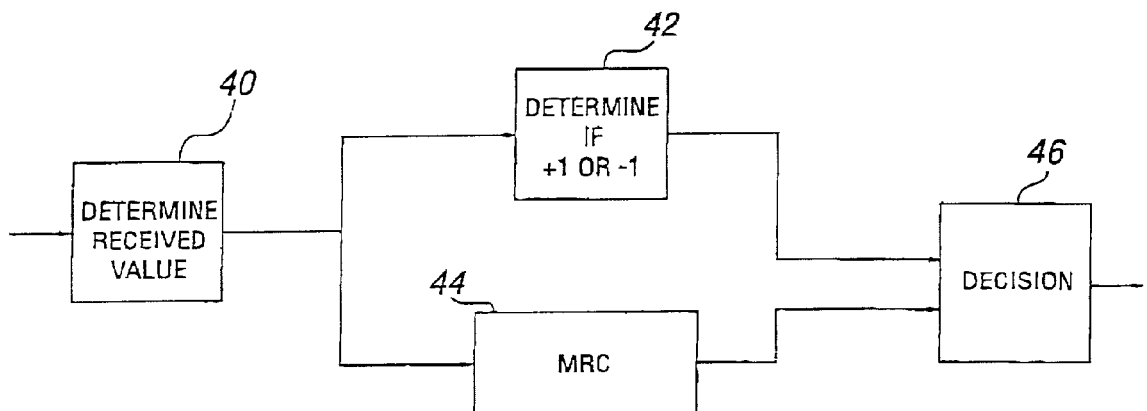
FIG. 3 shows a schematic view of a second embodiment.

Reference is now made to FIG. 3 which illustrates a second embodiment of the present invention. The block diagram of FIG. 3 illustrates figuratively elements present in a mobile station embodying the present invention. Each of the power control commands received by he mobile station is input to a first determination unit 40 which determines the received value of each power command. The value of each power command can fall in the range mentioned in relation to the first embodiment. A determination is then made as to whether each power control command represents 1 or −1 in a second determination unit 42. The second determination unit uses the method discussed in relation to FIG. 2 The output of the second determination unit 42 will be the minimum of all of the power control values determined by the second determining unit 42.

The value of each power control command is output to a maximum ratio combining unit 44 which sums the values received from each of the base stations with which the mobile station is in communication. The actual values which are received are summed eg 0.3 and −0.5. In preferred embodiments of the invention, all the values are given equal weight. However in other embodiments of the invention, the values may be weighted with respect to each other.

The summed value from the maximum ratio combining unit 42 and the minimum value (either 1 or −1) output from the second determination unit 42 are input to decision unit 46 which determines which of the two inputs has the minimum value. The minimum value is output by the decision unit 46. This output will control the transmission power of the mobile station and in particular whether it is decreased or increased. If the value from the second decision unit 42 is −1, the transmission power will be decreased regardless, of the value output by the maximum ratio combining unit 44. If the output of the second determination unit 42 is +1, the power will only be increased if the value of the maximum ratio combining unit 44 is above a given threshold. Otherwise, the power will be decreased. The threshold may be the same or different to the threshold used by the second determination unit 42.

It should be appreciated that in some embodiments of the present invention, the maximum ratio unit may be provided without the second determination unit and the decision as to whether to increase or decrease the power is made based on the summed value. A suitable threshold value is defined. If the sum is above the threshold, the power is increased. Below the threshold, the power is decreased. The summed valued may be divided by the number of power control values available.

Figure 4:
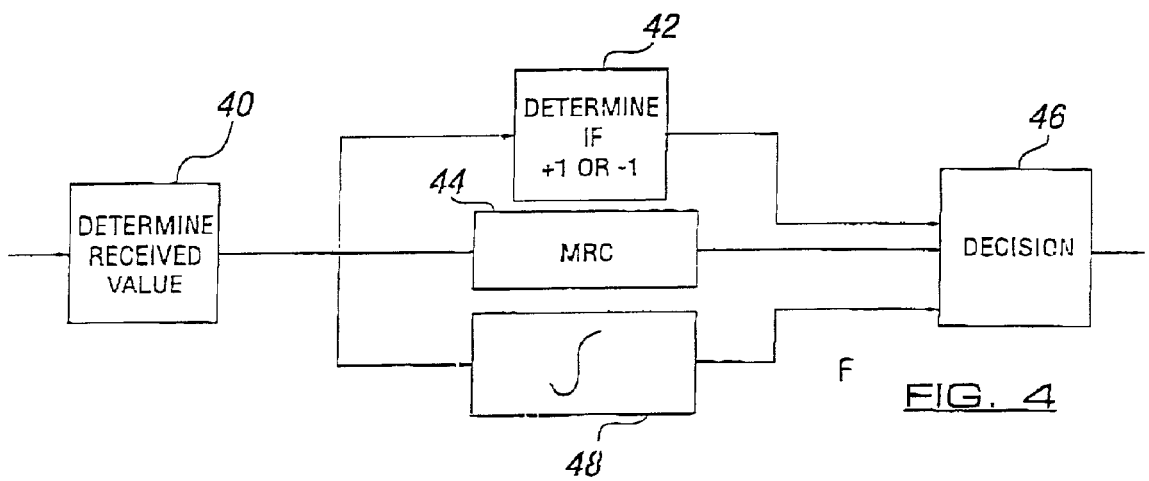
FIG. 4 shows a schematic view of a third embodiment.

Reference will now be made to FIG. 4 which shows a third embodiment of the present invention. The embodiment shown in FIG. 4 is the same as that shown in FIG. 3 with the addition of an integration unit 48 in parallel with the second determination unit 42 and the maximum ratio combining unit 44. The integration unit 48 is arranged to receive the received power control values from the first determination unit 40. The minimum power control value is selected by the integration unit 48. This minimum power control value is added to minimum power control values which have been received previously. If the resulting sum is below a given threshold and the minimum power control value indicates that the power should be increased, then the integration unit 48 will output the value −1. In other words the output of the integration unit will indicate that the power should be decreased. When these circumstances occur, the sum will be reset to a reset value of, for example 0. Otherwise the integration unit 48 will output the selected minimum value. The output of the integration unit 48 is input to the decision unit.

The threshold value may for example be −0.6. The purpose of the integration unit is to prevent the power from being increased in error particularly in response to power increase commands derived from a received value which is close to the threshold. In other words, if the power is increased too often in a given time frame, the next command to increase power will be ignored and the power will be decreased in that step. The threshold may be the same as that used by the second determination unit but is preferably different.

The behaviour of the integration unit can be summarised as follows:

sum of previous power command values and new power control value falls below the sum threshold and new power control value exceeds threshold which indicates that power control value represents an increase power command, then output a decrease power command and reset sum to 0 or any other appropriate reset value;

sum of previous power command values and new power control value falls below the sum threshold and new tower control value falls below threshold which indicates that power control value represents an decrease power command, then output a decrease power command and reset the sum to its reset value;

sum of previous power command values and new power control value exceeds below the sum threshold and new power control value exceeds threshold which indicates that power control value represents an increase power command, then output an increase power command; and sum of previous power command values and new power control value exceeds the sum threshold and new power control value falls below the threshold which indicates that power control value represents an decrease power command, then output an decrease power command and reset the sum to its reset value.

The decision unit 46 operates in the same manner as in the second embodiment except the minimum value of all three inputs are selected.

The integration unit 48 allows preceding power control commands to affect the behaviour of the mobile station taking into account the currently received power control command value. In other words a power control command history can be built up and used to influence current the power control behaviour of the mobile station.

In one modification of this embodiment, the integration unit 48 is arranged to process in parallel each of the power control values from each of a plurality of base stations. The results of each of the separate summing may be input to the decision unit 46. Alternatively, the results of the summing may be combined together in any suitable manner before being input to the decision unit 46.

The embodiments described hereinbefore have included three different methods:
1. determining the value of a power command using a threshold value;
2. summing the received power control values to determine if the mobile station should increase or decrease it power; and
3. integrating the power command values with respect to time and ignoring commands to increase power in certain conditions.

Embodiments of the present invention may incorporate one, any two or three of the above methods. In other words the first method can be used on its own, with the second method or the third method, or with both the second and third methods. The second and third methods can also be used on their own or with each other.

Figure 5A:
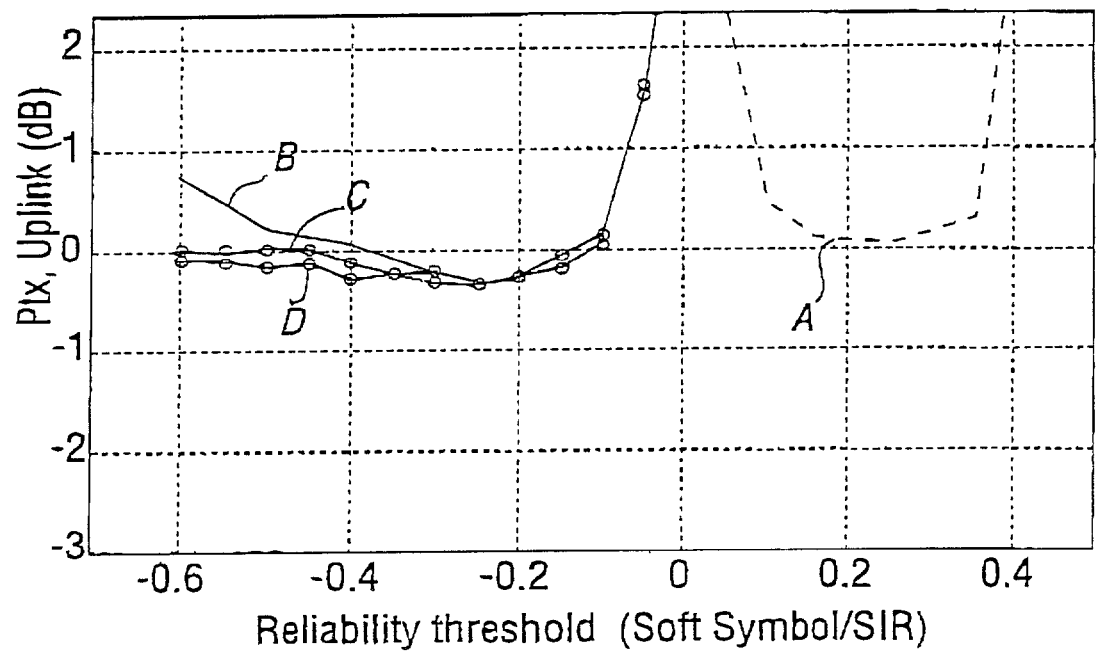
FIGS. 5a to d show simulations of using the methods embodying the present invention.
Figure 5B:
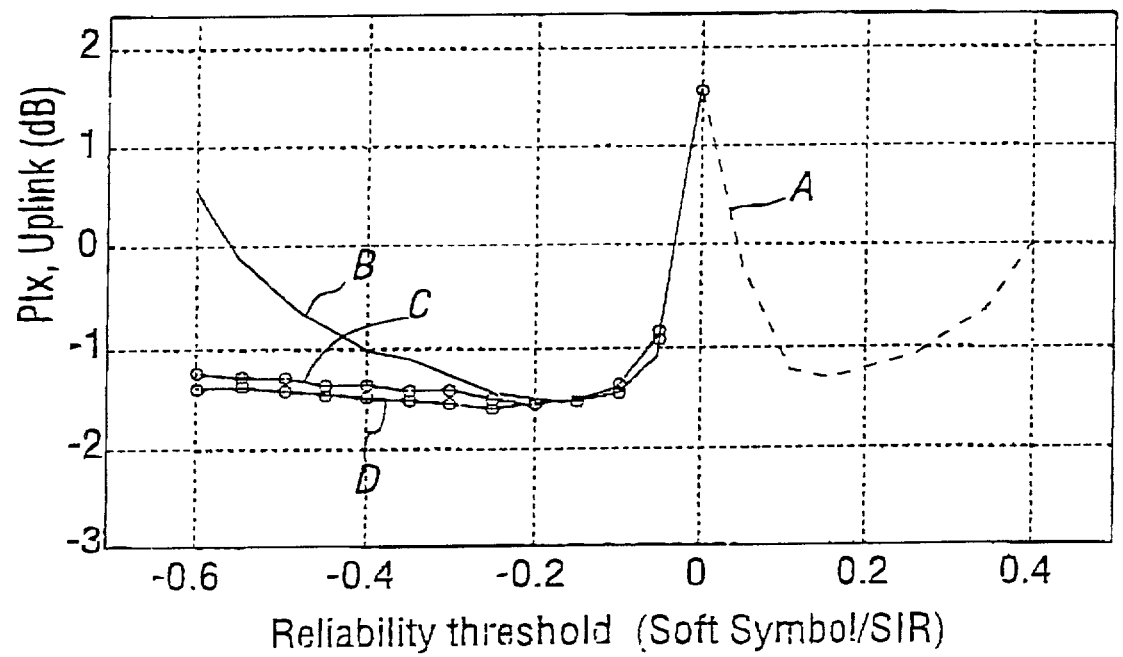
Figure 5C:
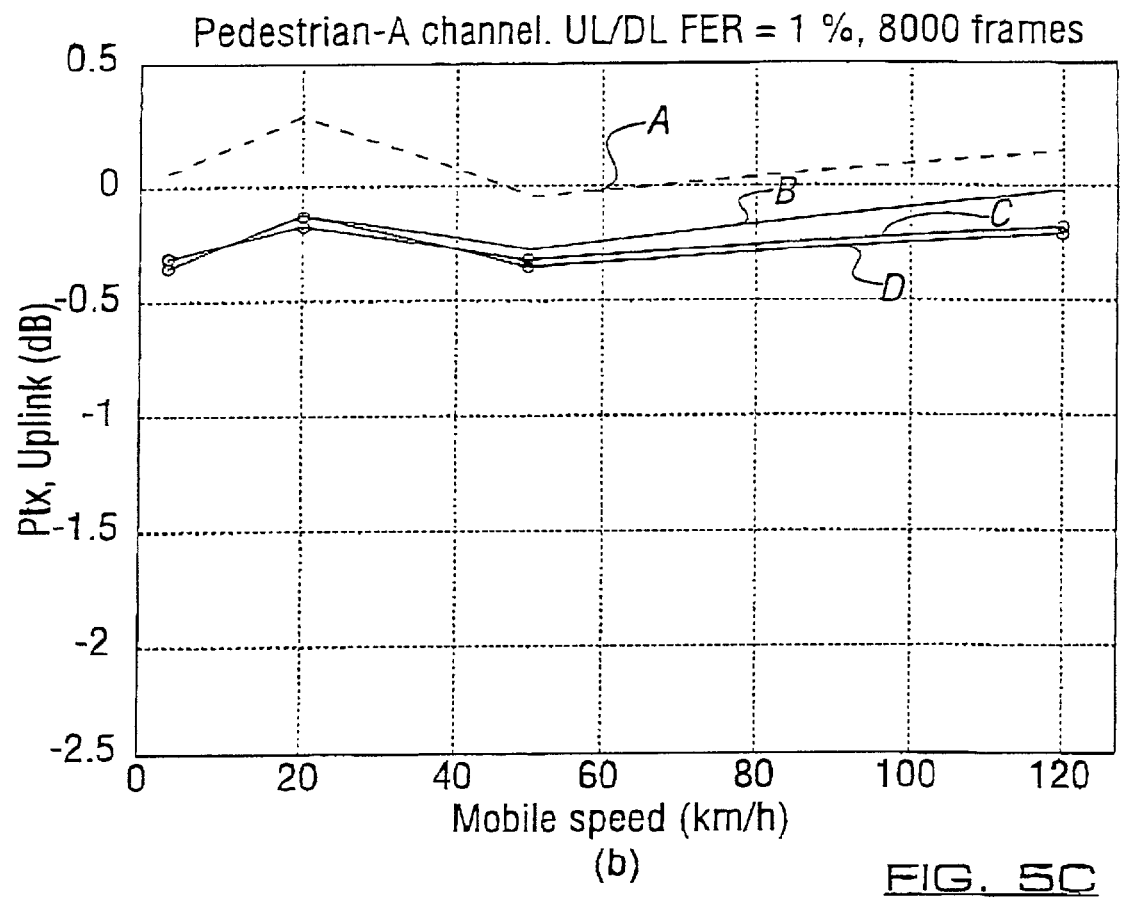
Figure 5D:
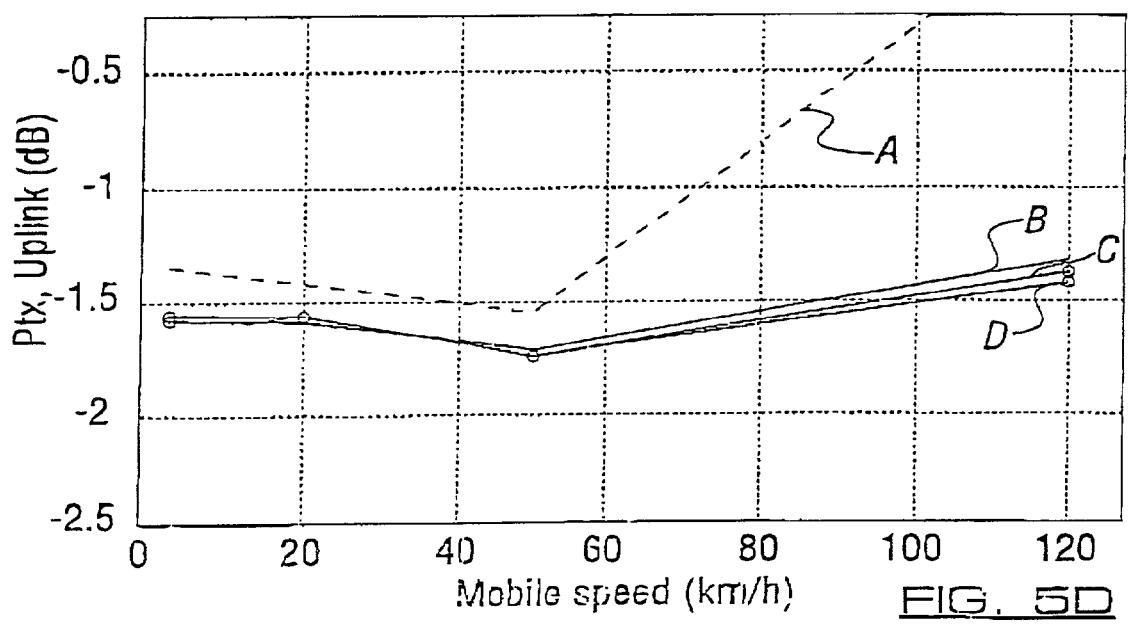

Reference is made to FIGS. 5a to d which show simulations of the various methods. Each graph includes four curves. Curve A represents the prior art which uses the signal to interference ratio. Curve B represents a simulation using the first method. Curve C represent represents a simulation using the first and second methods. Curve D represents a simulation using the first, second and third methods. FIGS. 5a and 5b show the transmission power of a mobile station plotted against different threshold values for the first method. The mobile station is moving at 3 km?h in both cases. With FIG. 5a, the frame error rate is 1% whilst with FIG. 5b the frame error rate is 10% FIGS. 5c and 5d show the transmission power of a mobile station plotted against the speed of the mobile station. The frame error rate is 1% for the FIG. 5c and 10% for FIG. 5d.

As can be seen, use of the first method on its own reduces the power transmitted by the mobile station significantly as compared to the prior art. The use of the first method in conjunction with the second method further reduces the power transmitted by the mobile station. The use of the first, second and third methods in combination still further reduces the power with which the mobile station transmits without altering the performance.

In the preferred embodiment of the present invention, the mobile station will always be instructed by a base station to increase or decrease its power in, for example, 1 dB steps. However in alternative embodiments more than two power control commands may be provided. However additional threshold would have to be defined. For example, if three power control commands were available, two threshold would be defined. These three power control commands could be increase, decrease and stay the same.

It should be appreciated that any of the different method described hereinbefore can be used to determine whether or not a power control command value is reliable and accordingly whether or not the power control value should be considered or ignored.

The present embodiment has been described in the context of this CDMA system. However, it should be appreciated that embodiments of the present invention can be applied to any other suitable access technique including other spread spectrum techniques, frequency division multiple access, time division multiple access and hybrids thereof.

The embodiments described hereinbefore have controlled the power with which a mobile station transmits power. The present invention can also be used to control the transmission power of base stations. The invention can also be used with fixed stations, particularly where the radio environment varies over time.

The invention claimed is:

1. A method, comprising:
receiving from each of a plurality of second stations at a first station a power control command having a given value, wherein the given values for the power control commands are determined from the strength of signals received at the plurality of second stations from said first station;
determining received values of said received power control commands;
combining the determined received values of the received power control commands from each of the second stations to generate a combined value;
comparing the determined received values with a first threshold value, determining a given value for each received power control command based on the comparison, and selecting one of the determined given values in accordance with a predetermined criterion; and
controlling the power at which the first station transmits signals based on the combined value from combining determined received values and the selected determined given value from comparing the determined received values.

2. The method as claimed in claim 1, wherein the given value of each power control command comprises either a first value indicating that the power should be increased or a second value indicating that the power should be decreased.

3. The method as claimed in claim 2 wherein said predetermined criteria is to select the second value if at least one of said determined given values is the second value, and to select the first value if all of the determined given values are the first value.

4. The method as claimed in claim 2 wherein said first threshold value is between said first and second values.

5. The method as claimed in claim 4 wherein said first threshold value is closer to one of the first and second values than to the other.

6. The method as claimed in claim 5, wherein the first threshold value is closer to the second value than to the first value.

7. The method as claimed in claim 2, wherein the first value is +1 and the second value is −1.

8. The method as claimed in claim 7, wherein the threshold value is in the range −0.6 to 0.

9. The method as claimed in claim 8, wherein the threshold value is in the range −0.25 and −0.03.

10. The method as claimed in claim 2, wherein the one of the combined value and the selected determined given value which is closer to a predetermined one of said first and second given values is selected.

11. The method as claimed in claim 10, wherein said predetermined one of said values is the second value.

12. The method as claimed in claim 1, further comprising:
summing a selected one of the determined received values of the power control commands currently received from the second stations and a selected one of the determined received values of the power control commands previously received from the second stations;
comparing the summed value with a third threshold value;
outputting a default value if the summed value exceeds the third threshold value, and otherwise outputting the selected one of the determined received values of the power control commands current received from the second stations; and
controlling the power which the mobile station transmits on the basis of the output of outputting a default value.

13. An apparatus, comprising:
determining means for determining received values of power control command received from a plurality of second stations, each power control command having a given value, wherein the given values for the power control commands are determined from the strength of signals received at the plurality of second stations from a first station;
combining means for combining the determined received values of said received power control command from each of the second stations to generate a combined value;
means for comparing the determined received values with a first threshold value, determining a given value for each received power control command based on the comparison, and selecting one of the determined given values in accordance with a predetermined criterion; and
controlling means for controlling the power with which the first station transmits to the second stations based on said combined value and the selected determined given value.

14. An apparatus, comprising:
transmitting means for transmitting signals to a plurality of stations;
receiving means for receiving power control commands from said plurality of stations; determining means for determining received values of power control command received from the plurality of stations, each power control command having a given value, wherein the given values for the power control commands are determined from the strength of signals received at the plurality of stations from the apparatus;
combining means for combining the determined received values of said received power control command from each of the stations to generate a combined value; means for comparing the determined received values with a first threshold value, determining a given value for each received power control command based on the comparison, and selecting one of the determined given values in accordance with a predetermined criterion; and
controlling means for controlling the power with which the apparatus transmits to the stations based on said combined value and the selected determined given value.

15. The apparatus as claimed in claim 13, wherein the given value of each power control command comprises either a first value indicating that the power should be increased or a second value indicating that the power should be decreased, and
wherein if the selected determined given value is the second value, the controlling means decreases the power with which the first station transmits regardless of the combined value, and
if the selected determined given value is the first value and the combined value exceeds a second threshold value, the controlling means increases the power with which the first station transmits, and
if the selected determined given value of the first value and the combined value is below the second threshold value, the controlling means decrease the power with which the first station transmits.

16. The method as claimed in claim 1, wherein the given value of each power control command comprises either a first value indicating that the power should be increased or a second value indicating that the power should be decreased, and if the selected given value is the second value, the power with which the first station transmits is decreased regardless of the combined value, and
if the selected determined given value is the first value and the combined value exceeds a second threshold value, the power with which the first station transmits is increased, and
if the selected determined given value is the first value and the combined value is below the second threshold value, the power with which the first station transmits is decreased.

17. The method as claimed in claim 1, wherein the second stations are base stations.

18. The method as claimed in claim 1, wherein the first station is a mobile station.

19. The apparatus as claimed in claim 13, wherein the first station is a mobile station.

20. The apparatus as claimed in claim 13, wherein the second stations are base stations.

21. An apparatus, comprising:
a determiner configured to determine received values of power control command received from a plurality of second stations, each power control command having a given value, wherein the given values for the power control commands are determined from the strength of signals received at the plurality of second stations from a first station;
a combiner configured to combine the determined received values of said received power control command from each of the second stations to generate a combined value;
a comparator configured to compare the determined received values with a first threshold value, determine a given value for each received power control command based on the comparison, and select one of the determined given values in accordance with a predetermined criterion; and a controller configured to control the power with which the first station transmits to the second stations based on said combined value and the selected determined given value.

22. The apparatus as claimed in claim 21, wherein the first station is a mobile station.

23. The apparatus as claimed in claim 21, wherein the second stations are base stations.

24. The apparatus as claimed in claim 21, wherein the given value of each power control command comprises either a first value indicating that the power should be increased or a second value indicating that the power should be decreased, and wherein if the selected determined given value is the second value, the controller is configured to decrease the power with which the first station transmits regardless of the combined value, and if the selected determined given value is the first value and the combined value exceeds a second threshold value, the controller is configured to increase the power with which the first station transmits, and if the selected determined given value of the first value and the combined value is below the second threshold value, the controller is configured to decrease the power with which the first station transmits.

25. The apparatus as claimed in claim 24, wherein said first threshold value is between said first and second values.

26. The apparatus as claimed in claim 25, wherein said first threshold value is closer to one of the first and second values than to the other.

27. The apparatus as claimed in claim 26, wherein said first threshold value is closer to the second value than to the first value.

28. The apparatus as claimed in claim 24, wherein the first value is +1 and the second value is −1.

29. The apparatus as claimed in claim 28, wherein the threshold value is in the range −0.6 to 0.

30. The apparatus as claimed in claim 29, wherein the threshold value is in the range −0.25 and −0.03.

31. The apparatus as claimed in claim 24, wherein the one of the combined value and the selected determined given value which is closer to a predetermined one of said first and second given values is selected.

32. The apparatus as claimed in claim 31, wherein said predetermined one of said values is the second value.

* * * * *